United States Patent [19]

Takahashi et al.

[11] Patent Number: 4,908,283
[45] Date of Patent: Mar. 13, 1990

[54] PREPARATION OF ION CONDUCTIVE SOLID ELECTROLYTE

[75] Inventors: Toru Takahashi; Ryuichi Shimizu; Tsutomu Suehiro; Hidetomo Ashitaka, all of Ichihara, Japan

[73] Assignee: UBE Industries, Ltd., Ube, Japan

[21] Appl. No.: 342,122

[22] Filed: Apr. 24, 1989

Related U.S. Application Data

[63] Continuation-in-part of Ser. No. 106,641, Oct. 8, 1987.

[30] Foreign Application Priority Data

| Oct. 9, 1986 [JP] | Japan | 61-239041 |
| Oct. 9, 1986 [JP] | Japan | 61-239042 |
| Nov. 26, 1986 [JP] | Japan | 61-281148 |
| Jan. 23, 1987 [JP] | Japan | 62-12273 |

[51] Int. Cl.$^4$ .................. H01M 6/18/10/26
[52] U.S. Cl. .................. 429/192; 429/217
[58] Field of Search .................. 429/192, 217

[56] References Cited

U.S. PATENT DOCUMENTS

| 4,556,614 | 12/1985 | Mehaute et al. | 429/192 |
| 4,579,793 | 4/1986 | Armand et al. | 429/192 |
| 4,654,279 | 3/1987 | Bauer et al. | 429/192 |

FOREIGN PATENT DOCUMENTS

| 55-86070 | 6/1980 | Japan | 429/192 |
| 0047372 | 3/1985 | Japan | 429/192 |
| 2119162 | 11/1983 | United Kingdom | 429/192 |

Primary Examiner—Donald L. Walton
Attorney, Agent, or Firm—Frishauf, Holtz, Goodman & Woodward

[57] ABSTRACT

An improved ion conductive solid electrolyte favorably emplolyable for an solid electrolyte cell comprises a cured product of an acryloyl-denatured polyalkylene oxide having a molecular weight of 200–3,000 and an inorganic ion salt. Another improved ion conductive solid electrolyte comprises a cured product of an acryloyl-denatured polyalkylene oxide having a molecular weight of 200–3,000, an inorganic ion salt and a polyalkylene glycol.

16 Claims, No Drawings

PREPARATION OF ION CONDUCTIVE SOLID ELECTROLYTE

REFERENCE TO RELATED APPLICATION

This is a continuation-in-part application of U.S. patent application Ser. No. 07/106,641 filed on Oct. 8, 1987 now abandoned.

BACKGROUND OF THE INVENTION

1. Field of the Invention

This invention relates to a process for the preparation of an ion conductive solid electrolyte. The ion conductive solid electolyte is favorably employable for the preparation of a solid electrolyte cell.

2. Description of Prior Art

A liquid electrolyte has been heretofore employed as an electrolyte for a primary cell, a secondary cell, an electrochromic display element, etc. However, the liquid electrolyte has a problem of confidence in storage for a long time, because a liquid or an electrode material sometimes leaks out of the cell or element.

A solid electrolyte does not have such a problem, and has an advantage that a constitution of a device is made simple. Further, it is possible to make parts of the device lightweight and small by forming the electrolyte into a thin film. Since these characteristic features of the solid electrolyte meet the requirements in electronics industry to supply small-sized, light-weight electronic parts and elements with high confidence. Accordingly, active studies have been made on improvement of a solid electrolyte.

It has been known that inorganic materials such as β-alumina, silver oxide, rubidium, lithium iodide, etc. are employable as solid electrolytic materials. However, the inorganic material has problems in its practical use such that it is expensive and generally difficult to form the inorganic material into an optional shape such as a thin film.

A polymer has an advantage in that it can be formed into a uniform thin film of an optional shape. Therefore, it has been proposed to employ various polymers as material of solid electrolyte. For instance, solid electrolytes containing a composition comprising a combination of a polymer such as polyethylene oxide, polypropylene oxide, polyethyleneimine, polyepichlorohydrin, polyethylene succinate or the like and an inorganic ion salt such as a salt of Li, Na, or the like, as well as cells employing the composition are described in Japanese Patent Provisional Publication Nos. 55(1980)-98480, 58(1983)-75779, 58(1983)-108667, 58(1983)-188062, 58(1983)-188063 and 59(1984)-71263 and U.S. Pat. No. 4,576,882. However, these compositions are scarcely used in practice, because the ion conductivity of these compositions does not reach a sufficient level.

In the case using a solid electrolyte material, such low conductivity can be compensated by forming the electrolyte into a thin film. For example, where the solid electrolyte is used as a diaphragm of a cell, internal resistance can be reduced by forming the electrolyte into a very thin film.

As processes to form the solid polymer electrolyte into a thin film, there are described a process which comprises casting a solution of the solid polymer electrolyte and removing a solvent by evaporation or a process which comrises heat polymerization of a polymerizable liquid monomer coated on a base in Japanese Patent Provisional Publication Nos. 60(1985)-47372 and 60(1985)-49573.

However, the process for evaporation of the solvent is not advantageous from the viewpoint of working conditions, and moreover the heat polymerization needs a long time operation.

Japanese Patent Provisional Publication Nos. 59(1984)-149601 and 58(1983)-75779 describe that the insufficient ion conductivity of solid polymer electrolytes can be improved by incorporation of an organic solvent, keeping its solid condition. However, the organic solvent used in the polymer electrolyte is apt to vaporize or leak out of an electronic element using the electrolyte due to its low boiling point. Accordingly, the ion conductivity likely lowers in the course of the employment of the element or the element is likely damaged after its long term employment.

Solid State Ionics, vol., 11, 227 (1983) teaches a solid electrolyte composition comprising a polymethacrylic acid, lithium perchlorate and polyethylene glycol having a molecular weight of 400. Japanese Patent Provisional Publication 59(1984)-71263 proposes a solid electrolyte composition comprising polymethacrylate, a lithium salt and polyethylene glycol (or polypropylene glycol). Although these electrolytes are almost free from vaporization or leak-out of a component from the electrolyte composition, the level of ion conductivity is still unsatisfactory.

Japanese Patent Provisional Publication No. 58(1983)-82477 (corresponding to U.S. Pat. No. 4,556,614) proposes a solid electrolyte of a cross-linked network matrix comprising polyethylene oxide, an alkali salt and a cross-linkable polymer. However, it is required that the electrolyte is crosslinked to have the network matrix at an elevated temperature so as to keep its amorphous state, because the polyethylene oxide preferably employed in the art has such a high molecular weight of 5,000 to 7,000,000 so as to easily form in conjunction with the alkali salt a crystalline structure. Further, the ion conductivity of the obtained electrolyte is still unsatisfactory.

SUMMARY OF THE INVENTION

An object of the present invention is to provide a process for the preparation of an ion conductive solid electrolyte which is improved in ion conductivity and is almost free from vaporization or leak-out of a component of the electrolyte.

Another object of the invention is to provide an ion conductive solid electrolyte which is improved in ion conductivity and is almost free from vaporization or leak-out of a component of the electrolyte.

A further object of the invention is to provide a solid electrolyte cell using an ion conductive solid electrolyte which is improved in ion conductivity and is almost free from vaporization or leak-out of a component of the electrolyte.

There is provided by the present invention a process for the preparation of an ion conductive solid electrolyte, which comprises curing a composition comprising an acryloyl-denatured polyalkylene oxide and an inorganic ion salt by irradiating the composition with an active light.

There is also provided by the invention a solid electrolyte cell using a solid electrolyte film and a negative pole comprising lithium metal or lithium alloy, wherein said electrolyte film is a cured product prepared by irradiating a composition comprising an acryloyl-denatured polyalkylene oxide and an inorganic ion salt with active rays.

There is further provided an ion conductive solid electrolyte, which comprises a cured product of a composition comprising:

an acryloyl-denatured polyalkylene oxide containing an acryloyl group having the formula:

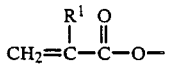

wherein $R^1$ is hydrogen or a lower alkyl group having 1-6 carbon atoms, and a polyalkylene oxide chain having the formula:

wherein n is an integer of 1 to 30, preferably 2 to 20, more preferably 3 to 15; and R is hydrogen or a lower alkyl group;

an inorganic ion salt; and a polyalkylene glycol having the formula:

wherein n is an integer of 2 to 30, preferably 3 to 20, more preferably 5 to 15; and each of $R^3$, $R^4$ and $R^5$ independently is hydrogen or a lower alkyl group having 1-6 carbon atoms.

There is further provided by the invention a solid electrolyte cell using a negative pole comprising lithium metal or lithium alloy and a positive pole, wherein said positive pole is a cured product of a composition comprising:

an active material of positive pole;

an acryloyl-denatured polyalkylene oxide containing an acryloyl group having the formula:

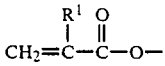

wherein $R^1$ is hydrogen or a lower alkyl group having 1-6 carbon atoms, and a polyalkylene oxide chain having the formula:

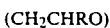

wherein n is an integer of 1 to 30, preferably 2 to 20, more preferably 5 to 15; and R is hydrogen or a lower alkyl group having 1-6 carbon atoms;

an inorganic ion salt; and a polyalkylene glycol having the formula:

wherein n is an integer of 3 to 30, preferably 4 to 20, more preferably 5 to 15; and each of $R^3$, $R^4$ and $R^5$ independently is hydrogen or a lower alkyl group having 1-6 carbon atoms.

DETAILED DESCRIPTION OF THE INVENTION

The acryloyl-denatured polyalkylene oxide generally employed in the present invention contains an acryloyl group and a polyalkylene oxide chain.

The acryloyl group has the formula:

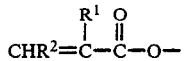

wherein $R^1$ is hydrogen or a lower alkyl group such as an alkyl group having 1-6 carbon atoms, e.g., methyl, ethyl, propyl, butyl, pentyl or hexyl; and $R^2$ is hydrogen or an aromatic group such as phenyl, toluyl or xylyl.

The polyalkylene oxide chain has the formula:

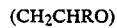

wherein n is an integer of 1 to 30, preferably 2 to 20, more preferably 3 to 15; and R is hydrogen or a lower alkyl group such as an alkyl group having 1-6 carbon atoms.

Examples of the acryloyl-denatured polyalkylene oxides include triethylene glycol monoacrylate, tetraethylene glycol monoacrylate, polyethyleneglycol monoacrylate, methoxytetraethylene glycol monoacrylate, phenoxytetraethylene glycol monoacrylate, methoxypolyethylene glycol monoacrylate, triethyleneglycol monomethacrylate, polyethylene glycol monomethacrylate, methoxypolyethylene glycol monomethacrylate, polyethylene glycol cinnamate, polyethylene glycol diacrylate, polyethylene glycol dimethacrylate, triethylene glycol trimethylolpropane triacrylate, or those wherein the ethylene glycol moiety is replaced with a propylene glycol moiety.

The molecular weight of the acryloyl-denatured polyalkylene oxide preferably is from 200 to 3,000, more preferably from 500 to 2,000, and most preferably 500 to 1,500.

The acryloyl denatured-polyalkylene oxide can be used singly or in combination.

There also is no specific limitation with respect to the inorganic ion salt. Examples of the inorganic ion salts include $LiClO_4$, $LiI$, $LiSCN$, $LiBF_4$, $LiAsF_6$, $LiCF_3SO_3$, $LiPF_6$, $NaI$, $NaSCN$, $NaBr$, $KI$, $CsSCN$, $AgNO_3$, $CuCl_2$, and $Mg(ClO_4)_2$. The inorganic ion salt preferably contains at least one atom selected from the group consisting of Li, Na, K, Cs, Ag, Cu and Mg.

An amount of the inorganic ion salt is 0.05 to 50 molar % based on one alkylene oxide unit (EO) of the acryloyl-denatured polyalkylene oxide ((inorganic salt/EO) X 100), and more preferably 0.1 to 30 molar %. If the amount of the inorganic ion salt is too large, the excessive inorganic ion salt is contained with no dissociation, and accordingly the ion conductivity lowers.

The inorganic ion salt can be used singly or in combination.

There is no specific limitation with respect to the method for the preparation of the composition of the inorganic ion salt and the acryloyl-denatured polyalkylene oxide. However, it is preferred to admix the inorganic ion salt to the acryloyl-denatured polyalkylene oxide. If desired, the composition can be prepared by mixing both components uniformly in the presence of a solvent.

The composition of the invention can be used in combination with an organic solvent. Examples of the organic solvents include propylene carbonate, γ-butylolactone, ethylene carbonate, tetrahydrofuran, dimethoxyethane, dimethylsulfoxide, dioxolane and sulfolane.

The amount of the organic solvent is preferably not more than 200 weight % based on the amount of solid composition. An amount of the organic solvent exceeding 200 weight % is not preferably used in practice, because the mechanical property of the composition lowers.

The composition of the acryloyl-denatured alkylene oxide and the inorganic ion salt can be cured (hardened) by irradiating the composition with active rays such as ultraviolet rays or visible light, etc.

If desired, a photopolymerization initiator can be incorporated into the composition. Examples of the photopolymerization initiators include benzoin, 2-methylbenzoin, trimethylsilylbenzophenone, 4-methoxybenzophenone, benzoin methylether, acetophenone, anthraquinone, and 2,2-dimethoxy-2-phenylacetophenone.

The process for curing the above composition or its solution to form a thin solid film can be performed by the following manner. The composition or its solution is uniformly coated on a substrate such as an aluminum foil, a glass plate or a stainless steel plate by means of a rollor, a doctor blade, a bar coater, a silk screen or spinner to obtain a film of a composition or its solution. The film is then cured to form a solid thin film by irradiating it with active rays.

For the preparation of a solid electrolyte cell, the solid thin film obtained as above can be attached to an electrolytically active material. Alternatively, the composition for the preparation of the solid polymer electrolyte or its solution can be coated on the electrolytically active material and then irradiated with active rays to form a solid thin film.

In the preparation of a solid electrolyte cell, an electrolytically active material for negative pole can be lithium metal or a lithium alloy such as an alloy of lithium and aluminum, mercury or zinc.

There is no specific limitation with respect to an electrolytically active material for positive pole. Examples of the materials include manganese dioxide, molybdenum trioxide, vanadium pentaoxide, sulfides of titanium and niobium, oxide of chromium, and copper oxide. The electrolytically active material can be mixed with an electroconductive agent such as graphite and a binder such as poly(tetrafluoroethylene) to form under pressure to prepare a positive plate.

For instance, a cell can be prepared by the following process.

A positive plate is prepared by molding a mixture of an electrolytically active material for positive pole, graphite and a binder such as poly(tetrafluoroethylene) under pressure and heating the molded product. A foil of lithium metal (electrolytically active material for negative pole) is coated with the electrolyte composition and irradiated with active rays to form a thin solid film of the electrolyte composition on the foil. On thus obtained composite product is laminated the positive plate to give a cell.

Specifically, a composition comprising an acryloyl-denatured polyalkylene oxide containing an acryloyl group having the formula:

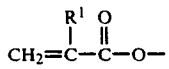

wherein $R^1$ is hydrogen or a lower alkyl group such as an alkyl group having 1–6 carbon atoms, and a polyalkylene oxide chain having the formula:

wherein n is an integer of 1 to 30, preferably 2 to 20, more preferably 3 to 15; and R is hydrogen or a lower alkyl group having 1–6 carbon atoms;
an inorganic ion salt; and
a polyalkylene glycol having the formula:

wherein n is an integer of 2 to 30, preferably 3 to 20, more preferably 5 to 15; and each of $R^3$, $R^4$ and $R^5$ independently is hydrogen or a lower alkyl group having 1–6 carbon atoms, can be advantageously cured not only by irradiation of active rays but also other method such as a method of heating the composition.

The above-mentioned polyalkylene glycol may be tetraethylene glycol, hexaethylene glycol, octaethylene glycol, and monomethyl ether thereof and dimethylether thereof, and glycols wherein the ethylene glycol of the above compounds is replaced with propylene glycol.

The polyalkylene glycol can be used singly or in combination.

The polyalkylene glycol preferably has a molecular weight in the range of 180 to 2,000. If the molecular weight is too high, the ion conductivity is apt to lower. If the molecular weight is extremely low, the polyalkylene glycol is apt to vaporize from the composition because such polyalkylene glycol has a low boiling point.

The polyalkylene glycol is incorporated into the composition in an amount of, preferably, 1 to 500 weight %, more preferably 25 to 400 weight %, based on the amount of the acryloyl-denatured polyalkylene oxide. If the amount of the polyalkylene glycol is too large, the resulting cured product has poor mechanical characteristics. If the amount is too small, the ion conductivity lowers.

As mentioned above, the above-mentioned compositin can be cured by heating method. If the composition is to be cured by heating method, the composition preferably contains as an initiator a peroxide such as benzoyl peroxide, methyl ethyl ketone peroxide, t-butyl peroxypyvarate or diisopropyl peroxycarbonate.

The composition comprising the acryloyl-denatured polyalkylene oxide, a lithium ion salt and the alkylene glycol (wherein n is an integer of 3 to 30) can be advantageously employed as a binder to prepare an positive pole. This binder is more favorable than a conventionally employed binder such as poly(tetrafluoroethylene). The poly(tetrafluoroethylene) shows low ion conductivity, and lowers a cell propety when it is used in a large amount because it is apt to cover the electrolytic active material for positive pole. Thus, the conventional binder has drawbacks with respect to the cell property and easiness in processing.

The positive pole such as a positive plate can be prepared by curing a mixture of the above-mentioned composition and an electrolytic active material for positive pole such as described hereinbefore by irradiating the mixture with active rays or heating the mixture.

The present invention is further described by the following non-limitative examples.

EXAMPLE 1

0.75 g (EO=14.1 mmol.) of methoxypolyethylene glycol monoacrylate (AM-90G produced by Shin-Nakamura Kagaku Co., Ltd., Japan), 0.25 g (EO=3.6 mmol.) of polyethylene glycol dimethacrylate (9G produced by Shin-Nakamura Kagaku Co., Ltd), 0.08 g (0.75 mmol.) of lithium perchlorate (LiClO$_4$) and 0.004 g of 2,2-dimethoxy-2-phenylacetophenone were mixed to obtain a homogeneous solution.

The solution was coated on an aluminum dish to form a thin solution film, and then was irradiated using a 250 W extra-high pressure mercury lamp at illuminance of 5 mW/Cm$^2$ for 3 minutes under nitrogen atmosphere to obtain a cured film.

The specific conductivity ($\sigma$) of the cured film was measured by inpedance method at room temperature. The specific conductivity was $1.89 \times 10^{-5}$ S/cm.

EXAMPLES 2 TO 15

Cured films were prepared in the same manner as in Example 1, except that the amounts of AM-90G and 9G were changed as indicated in Table 1.

EXAMPLES 6 TO 10

Cured films were prepared in the same manner as in Example 1 except that the amounts of AM-90G and 9G were changed as indicated in Table 1 and 1 g of propylene carbonate (PC) was added.

EXAMPLES 11 TO 15

Cured films were prepared in the same manner as in Example 1 except that the amounts of AM-90G and 9G were changed as indicated in Table 1 and triethylene glycol trimethylolpropane triacrylate (Photomer 4155 produced by San Nobuko, Co., Ltd., Japan) was used in place of polyethylene glycol dimethacrylate (9G).

COMPARISON EXAMPLE 1

In this example, the composition prepared in Example 2 was polymerized using a peroxide.

1.0 g of AM-90G, 0.08 g (0.75 mmol.) of lithium perchlorate and 0.01 g of benzoyl peroxide were mixed to obtain a homogeneous solution.

The solution was coated on an aluminum dish to form a thin solution film, and then heated to 70° C. under nitrogen atomosphere for performing polymerization. It took 5 hours to cure the solution for formation of a solid film. The specific conductivity of the solid film was $1.1 \times 10^{-5}$ S/cm.

COMPARISON EXAMPLE 2

In this example, the composition prepared in Example 11 was polymerized using a peroxide.

0.75 g of AM-90G, 0.25 g of Photomer 4155, 0.08 g (0.75 mmol.) of lithium perchlorate and 0.01 g benzoyl peroxide was mixed to obtain a homogeneous solution.

The solution was coated on an aluminum dish to form a thin solution film, and then heated to 70° C. under nitrogen atomosphere for performing polymerization. It took 4 hrs. to cure the solution for formation of a solid film. The specific conductivity of the solid film was $0.84 \times 10^{-6}$ S/cm.

TABLE 1

| | Acryloyl-Denatured Polyacrylene Oxide | | Inorganic Ion Salt | Solvent | Specific Conductivity |
|---|---|---|---|---|---|
| | AM-00G (g) | 90G (g) | LiCl$_4$ (mmol.) | PC (g) | $\sigma$ (S/cm) |
| Example 1 | 0.75 | 0.25 | 0.75 | — | $1.89 \times 10^{-5}$ |
| Example 2 | 1.0 | — | 0.75 | — | $5.32 \times 10^{-5}$ |
| Example 3 | 0.50 | 0.50 | 0.75 | — | $1.74 \times 10^{-6}$ |
| Example 4 | 0.25 | 0.75 | 0.75 | — | $3.66 \times 10^{-7}$ |
| Example 5 | — | 1.0 | 0.75 | — | $2.74 \times 10^{-8}$ |
| Example 6 | 0.75 | 0.25 | 0.75 | 1.0 | $6.76 \times 10^{-4}$ |
| Example 7 | 0.5 | 0.5 | 0.75 | 1.0 | $3.88 \times 10^{-4}$ |
| Example 8 | 0.25 | 0.75 | 0.75 | 1.0 | $2.17 \times 10^{-4}$ |
| Example 9 | 0.75 | 0.25 | 0.375 | 1.0 | $3.55 \times 10^{-4}$ |
| Example 10 | 0.25 | 0.75 | 0.375 | 1.0 | $1.20 \times 10^{-4}$ |
| Example 11 | 0.75 | 0.25 | 0.75 | — | $1.40 \times 10^{-5}$ |
| Example 12 | 0.25 | 0.75 | 0.75 | — | $3.00 \times 10^{-7}$ |
| Example 13 | 0.75 | 0.25 | 0.75 | 1.0 | $4.80 \times 10^{-4}$ |
| Example 14 | 0.5 | 0.5 | 0.75 | 1.0 | $2.40 \times 10^{-4}$ |
| Example 15 | 0.25 | 0.75 | 0.75 | 1.0 | $2.10 \times 10^{-4}$ |

EXAMPLE 16

A positive plate (diameter 13 mm, thickness 0.35 mm) was prepared by molding a mixture of 68 mg of manganese dioxide, 8.5 mg of acetylene black and 8.5 mg of poly(tetrafluoroethylene) powder (binder, Luflon L-5 produced by Daikin Kogyo Co., Ltd., Japan) under pressure of 7.5 ton/cm$^2$ and heating the molded product to 300° C.

A liquid mixture of 1 g of triethylene glycol trimethylolpropane triacrylate (Photomer 4155), 0.08 g of lithium perchlorate, 0.04 of 2,2'-dimethoxyacetophenone (photosensitizer), 1 cc of propylene carbonate was coated on a lithium metal plate (diameter 16 mm, thickness 0.75 mm, negative plate) and then was irradiated using a 250 W extra-high pressure mercury lamp at illuminance of 5 mW/cm$^2$ for 3 minutes to obtain a cured film of 0.4 mm thick.

On the cured film was laminated the positive plate to obtain a cell. The cell was subjected to constant-current discharge test at 0.2 mA to give an electrical capacitance of 14 mA·hr.

COMPARISON EXAMPLE 3

A positive plate was prepared in the same manner as in Example 16.

A liquid mixture of 1 g of Photomer 4155, 0.08 g of lithium perchlorate, 0.01 g of benzoyl peroxide, 1 cc of propylene carbonate was coated on a lithium metal plate (same as in Example 16, negative plate) and then was heated to 70° C. for 4 hours under argon atmosphere to obtain a cured film of 0.4 mm thick.

On the cured film was laminated the positive plate to obtain a cell. The cell was subjected to the constant-current discharge test at 0.2 mA to give an electrical capacitance of 12.5 mA·hr.

EXAMPLE 17

0.75 g (EO=14.1 mmol.) of methoxypolyethylene glycol monoacrylate (AM-90G), 0.25 g (EO=3.6 mmol.) of polyethylene glycol dimethacrylate (9G), 0.08 g (0.75 mmol.) of lithium perchlorate (LiClO$_4$), 0.75 g (EO=16.3 mmol.) of polyethylene glycol (PEG #200 produced by Junsei Chemical Co., Ltd., Japan) and 0.01 g of 2,2-dimethoxy-2-phenylacetophenone were mixed to obtain a homogeneous solution.

The solution was coated on an aluminum dish to form a thin solution film, and then was irradiated using a 250 W extra-high pressure mercury lamp at illuminance of 5 mW/cm$^2$ for 3 minutes under nitrogen atmosphere to obtain a cured film.

The ion conductivity (o) of the cured film was measured by inpedance method at room temperature. The ion conductivity was $1.8 \times 10^{-4}$ ohme$^{-1}$/cm.

EXAMPLES 18 & 19

Cured films were prepared in the same manner as in Example 17, except that the amount of PEG #-200 was changed as indicated in Table 2.

COMPARISON EXAMPLE 4

A cured film was prepared in the same manner as in Example 17, except that the amount of PEG #-200 was changed as indicated in Table 2.

TABLE 2

|  | Acryloyl-Denatured Polyarylene Oxide | | Inorganic Ion Salt | PEG | Ion |
| --- | --- | --- | --- | --- | --- |
|  | AM-90G (g) | 90G (g) | LiCl$_4$ (mmol.) | #200 (g) | Conductivity (ohme$^{-1}$/cm) |
| Example 18 | 0.75 | 0.25 | 0.75 | 0.25 | $5.9 \times 10^{-5}$ |
| Example 19 | 0.75 | 0.25 | 0.75 | 0.50 | $1.2 \times 10^{-4}$ |
| Com. Ex. 4 | 0.75 | 0.25 | 0.75 | — | $1.9 \times 10^{-5}$ |

EXAMPLES 20 & 21

Cured films were prepared in the same manner as in Example 17, except that PEG #-200 was replaced with 0.75 of PEG #-400 (produced by Junsei Chemical Co., Ltd, for Example 20) and with 0.5 g of PEG #-400 (for Example 21).

The ion conductivity of the cured film was $1.1 \times 10^{-4}$ ohme$^{-1}$/cm for Example 20 and $8.1 \times 10^{-5}$ ohme$^{-1}$/cm for Example 21.

EXAMPLE 22

A cured film was prepared by coating a composition of 0.75 g of AM-90G, 0.25 of 9G, 0.08 g of LiClO$^4$, 0.01 g of benzoyl peoxide and 0.5 g of PEG #-200 on an aluminum dish to form a thin solution film and heating the coated composition at 70° C. for 14 hours.

The ion conductivity of the cured film was $8.7 \times 10^{-5}$ ohme$^{-1}$/cm.

COMPARISON EXAMPLE 5

A cured film was prepared in the same manner as in Example 17, except that PEG #-200 was not employed.

The ion conductivity of the cured film was $1.5 \times 10^{-5}$ ohme$^{-1}$/cm.

COMPARISON EXAMPLE 6

A cured film was prepared in the same manner as in Example 17, except that PEG #-200 was replaced with polyethylene glycol having a mean molecular weight of 3,000.

The ion conductivity of the cured film was $3.0 \times 10^{-5}$ ohme$^{-1}$/cm.

EXAMPLE 23

A positive plate (thickness 300 μm) was prepared by molding a mixture of 51.9 mg of manganese dioxide, 9.75 mg of acetylene black, 4.9 mg of methoxypolyethylene glycol monoacrylate (AM-90G), 1.6 mg of poly-ethylene glycol dimethacrylate (9G) and 0.065 mg of benzoyl peroxide under pressure of 7.5 ton/cm$^2$ to give a disc (diameter 13 mm, thickness 300 μm), impregnating the disc with 10 μl of a solution (conc.: 0.75 mmol.) of lithium perchlorate in dimethoxy polyethylene glycol (LX-521 produced by Asahi Denka Co., Ltd., Japan) and heating the molded product at 100° C. for 3 hours. The resulting disc showed satisfactory processability and mechanical strength.

1 ml of a liquid mixture of 0.75 g of AM-90G, 0.25 g of 9G, a solution (conc.: 0.75 mol/l) of lithium perchlorate in LX-521, and 0.01 g/l of 2,2'-dimethoxyacetophenone (photosensitizer) was prepared. 8 μl of the liquid mixture was coated on a lithium metal plate (diameter 16 mm, thickness 70 μm, negative plate) and then was irradiated using a 250 W extra-high pressure mercury lamp at illuminance of 5 mW/cm$^2$ for 3 minutes to obtain a cured film of 50 μm thick.

On the cured film was laminated the positive plate to obtain a solid electrolyte cell. The cell was subjected to constant-current discharge test at 43 μA to give an electrical capacitance of 7.3 mA·hr.

COMPARISON EXAMPLE 7

A solid electrolyte cell is prepared in the same manner as in Example 23 except that poly(tetrafluoroethylene) is employed as a binder.

The cell was subjected to constant-current discharge test in the same manner to give an electrical capacitance of 3.5 mA·hr.

We claim:

1. A process for the preparation of an ion conductive solid electrolyte, which comprises curing a composition comprising an acryloyl-denatured polyalkylene oxide having a molecular weight of 200 to 3,000 which comprises an acryloyl group having the formula:

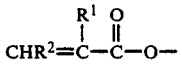

wherein
R$^1$ is hydrogen or a lower alkyl group having 1–6 carbon atoms; and
R$^2$ is hydrogen or an aromatic group;
and a polyalkylene oxide chain having the formula:

wherein
n is an integer of from 1 to 30; and
R is hydrogen or a lower alkyl group having 1–6 carbon atoms,
and an inorganic ion salt by irradiating the composition with active rays.

2. The process as claimed in claim 1, wherein said inorganic ion salt contains at least one atom selected from the group consisting of Li, Na, K, Cs, Ag, Cu and Mg.

3. The process as claimed in claim 1, wherein said composition contains the inorganic ion salt in an amount of 0.05–50 molar % based on the alkylene oxide unit of the acryloyl-denatured polyalkylene oxide.

4. The process as claimed in claim 1, wherein said composition contains an organic solvent selected from the group consisting of propylene carbonate, γ-butyrolactone, ethylene carbonate, tetrahydrofuran, acetonitrile, dimethoxyethane, dimethylsulfoxide, dioxolane and sulfolane in an amount of not more than 200 weight % based on the amount of composition.

5. The process as claimed in claim 1, wherein said composition contains a photopolymerization initiator.

6. A solid electrolyte cell using a solid electrolyte film and a negative pole comprising lithium metal or lithium alloy, wherein said electrolyte film is a cured product prepared by irradiating a composition comprising an acryloyl-denatured polyalkylene oxide and an inorganic ion salt with active rays, said acryloyl-denatured polyalklene oxide having a molecular weight of 200 to 3,000 and comprising an acryloyl group having the formula:

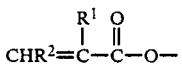

wherein
$R^1$ is hydrogen or a lower alkyl group having 1-6 carbon atoms; and
$R^2$ is hydrogen or an aromatic group;
and a polyalkylene oxide chain having the formula:

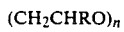

wherein
n is an integer of from 1 to 30; and R is hydrogen or a lower alkyl group having 1-6 carbon atoms.

7. The solid electrolyte cell as claimed in claim 6, wherein said composition contains the inorganic ion salt in an amount of 0.05-50 molar % based on the alkylene oxide unit of the acryloyl-denatured polyalkylene oxide.

8. The solid electolyte cell as claimed in claim 6, wherein said composition contains an organic solvent selected from the group consisting of propylene carbonate, γ-butyrolactone, ethylene carbonate, tetrahydrofuran, acetonitrile, dimethoxyethane, dimethylsulfoxide, dioxolane and sulfolane in an amount of not more than 200 weight % based on the amount of composition.

9. An ion conductive solid electrolyte, which comprises a cured product of a composition comprising:
an acryloyl-denatured polyalkylene oxide having a molecular weight of 200 to 3,000 which comprises an acryloyl group having the formula:

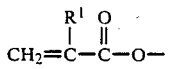

wherein
$R^1$ is hydrogen or a lower alkyl group having 1-6 carbon atoms,
and a polyalkylene oxide chain having the formula:

wherein
n is an integer of from 1 to 30; and
R is hydrogen or a lower alkyl group having 1-6 carbon atoms;
an inorganic ion salt; and
a polyalkylene glycol having the formula:

wherein
n is an integer of from 2 to 30; and
each of $R^3$, $R^4$ and $R^5$ independently is hydrogen or a lower alkyl group having 1-6 carbon atoms.

10. The ion conductive solid electrolyte as claimed in claim 9, wherein said inorganic ion salt contains an atom selected from the group consisting of Li, Na, K, Cs, Ag, Cu and Mg.

11. The ion conductive solid electrolyte as claimed in claim 9, wherein said composition contains the inorganic ion salt in an amount of 0.05-50 molar % based on the alkylene oxide unit of the acryloyl-denatured polyalkylene oxide.

12. The ion conductive solid electrolyte as claimed in claim 9, wherein said composition contains the polyalkylene glycol an amount of 1-500 weight % based on the acryloyl-denatured polyalkylene oxide.

13. A solid electrolyte cell using a negative pole comprising lithium metal or lithium alloy and a positive pole, wherein said positive pole is a cured product of a composition comprising:
an active material of positive pole;
an acryloyl-denatured polyalkylene oxide having a molecular weight of 200 to 3,000 which comprises an acryloyl group having the formula:

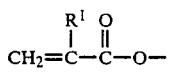

wherein
$R^1$ is hydrogen or a lower alkyl group having 1-6 carbon atoms,
and a polyalkylene oxide chain having the formula:

wherein
n is an integer of from 1 to 30; and
R is hydrogen or a lower alkyl group having 1-6 carbon atoms;
an inorganic ion salt; and
a polyalkylene glycol having the formula:

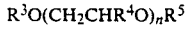

wherein
n is an integer of from 3 to 30; and
each of $R^3$, $R^4$ and $R^5$ independently is hydrogen or a lower alkyl group having 1-6 carbon atoms.

14. The solid electrolyte cell as claimed in claim 13, wherein said inorganic ion salt contains an atom of Li.

15. The solid electrolyte cell as claimed in claim 13, wherein said composition contains the inorganic ion salt in an amount of 0.05-50 molar % based on the alkylene oxide unit of the acryloyl-denatured polyalkylene oxide.

16. The solid electrolyte cell as claimed in claim 13, wherein said composition contains the polyalkylene glycol an amount of 1-500 weight % based on the acryloyl-denatured polyalkylene oxide.

* * * * *